United States Patent [19]

Hampton et al.

[11] Patent Number: 5,531,903
[45] Date of Patent: Jul. 2, 1996

[54] FLUORIDE REMOVAL FROM METAL SULPHATE SOLUTION AND A METHOD OF WASTE UTILIZATION

[75] Inventors: Cashman R. S. M. Hampton, Rossland; Victor E. Steiner, Trial; Daniel A. D. Boateng, Montrose, all of Canada

[73] Assignee: Cominco Ltd., Vancouver, Canada

[21] Appl. No.: 404,754

[22] Filed: Mar. 15, 1995

[51] Int. Cl.⁶ ........................................ C02F 1/28
[52] U.S. Cl. .................... 210/683; 210/915; 423/25; 423/34; 423/101; 423/140; 205/99; 588/248; 588/252
[58] Field of Search ............... 423/99, 100, 101, 423/25, 34, 140; 210/915, 683, 928; 205/99; 588/248, 252

[56] References Cited

U.S. PATENT DOCUMENTS

| 937,210 | 10/1909 | Harris | 204/149 |
|---|---|---|---|
| 2,043,705 | 6/1936 | Meinzer | 210/683 |
| 2,772,230 | 11/1956 | Hollander et al. | 204/119 |
| 3,907,653 | 9/1975 | Horn | 205/99 |
| 3,926,753 | 12/1975 | Lee | 204/149 |
| 4,028,237 | 6/1977 | Nishimura et al. | 423/320 |
| 4,159,246 | 6/1979 | Matsumoto | 204/149 |
| 4,355,017 | 10/1982 | Gamson et al. | 423/484 |
| 4,540,557 | 9/1985 | Gradl et al. | 423/309 |
| 4,567,027 | 1/1986 | Detournay et al. | 423/101 |
| 4,816,122 | 3/1989 | Lever | 204/182.4 |
| 4,948,489 | 8/1990 | Greenberg | 204/228 |

FOREIGN PATENT DOCUMENTS

| 53-26458 | 3/1978 | Japan | 210/915 |
|---|---|---|---|
| 55-070538 | 12/1981 | Japan . | |
| 57-108506 | 1/1984 | Japan . | |
| 685636 | 9/1979 | U.S.S.R. | 210/915 |

OTHER PUBLICATIONS

*Extracts from Chemical Abstracts* vol. 87, 1977, p. 259, 87:206078m, entitled Treatment of fluoroboron compound--containing wastewater.

*Extracts from Chemical Abstracts* vol. 87, 1977, p. 362, 87:11427s, entitled Treatment for fluorine–containing well water.

*Extracts from Chemical Abstracts* vol. 89, 1978, p. 277, 89:79834u, entitled Treatment for fluorine–and boron–containing wastewater.

*Extracts from Chemical Abstracts* vol. 95, 1981, p. 131, 95:45456f, entitled Purification of sodium sulfate containing fluoride.

*Extracts from Chemical Abstracts.* vol. 99, 1983, p. 308, 99:200077m, entitled Fluoride removal from wastewater.

*Other material* Rakhmankulov, A. I.; Kozlov, P. A.; Khan, O. A.; Marinina, K. I.; Korchagina, E. D.; Zababurina, R. M. "Mechanism of defluorination of zince sulphate solutions by aluminum hydroxide" (Russian with English translation). (1985).

pp. 322 and 323 from the *Encyclopedia of Chemical Technology* 4th ed., vol. 2.

pp. 385–390 from the *Industrial Crystallization 84*, edited by S. J. Jancie and E. J. de Jong, Elsevier Science Publishers B.V., Amsterdam, 1984—Printed in the Netherlands.

*Primary Examiner*—Cynthia L. Nessler
*Attorney, Agent, or Firm*—Elbie R. de Kock

[57] ABSTRACT

A process is provided for the removal of fluoride from a metal sulphate solution, such as a zinc sulphate solution, which presents an option for the disposal of waste treatment sludge from the aluminum anodizing industry. The fluoride is removed from metal sulphate solution by mixing the sludge with the solution for a predetermined period of time and then performing a solid/liquid separation.

19 Claims, No Drawings

FLUORIDE REMOVAL FROM METAL SULPHATE SOLUTION AND A METHOD OF WASTE UTILIZATION

FIELD OF THE INVENTION

This invention relates to a method of removing fluoride ions from a metal sulphate solution, particularly, but not exclusively, a zinc sulphate solution which is to be used as electrolyte in the electrowinning of zinc. It also relates to a method of waste utilization.

BACKGROUND OF THE INVENTION

Fluoride ions in zinc electrolyte cause corrosion of the aluminum cathode starting sheets commonly used in the zinc electrowinning process. Fluoride also causes the zinc which is deposited on the aluminum cathode to stick to the cathode making the removal of the deposited zinc metal difficult. The costs of replacing damaged aluminum starting sheets can be reduced by ensuring that fluoride levels in zinc electrolyte are kept low.

A known method of dealing with this problem has been to add $Al^{3+}$ and $PO_4^{3-}$ ions to the zinc sulphate solution and adjusting the pH so that fluoride is coprecipitated with the aluminum and phosphate ions, as described in U.S. Pat. No. 4,567,027. In another method, fluoride is removed by contacting the fluoride containing solution with freshly precipitated aluminum hydroxide, as described in Japanese patent application No. 8070538 dated May 26, 1980, in the name of Mitsui Petrochem Ind. Ltd.

In the known methods, the aluminum hydroxide is either precipitated in situ or is a freshly prepared precipitate which is added. The effectiveness for fluoride removal depends on the form of the aluminum hydroxide. It can be shown that the presence of amorphous $Al(OH)_3$ is needed for chemisorptive removal of fluoride. Crystalline (gibbsite) aluminum hydroxide (alumina trihydrate) is not effective for chemisorptive removal of fluoride from zinc sulphate solutions by simply stirring alumina trihydrate with the solution to be treated. It has been shown that the gelatinous aluminum hydroxide, formed by raising the pH of an aluminum salt solution, is converted on aging from an amorphous to a crystalline form. The crystalline transformation can occur within a period of from 1 to 7 days at ambient temperature when the pH is greater than 7. Therefore, the prior art methods either use a freshly prepared precipitate or form the precipitate in situ.

It has surprisingly been found by the inventors that aluminum anodizing waste treatment sludge can be used for the removal of fluoride from zinc electrolyte, even when wet (70–80% moisture) and at pH values from 6.8–9.2, and that the anodizing sludge is still effective after months of storage. The sludge is also effective if dried at 120° to 140° C. and crushed before use. This is surprising in view of the fact that alumina trihydrate is not effective for this purpose, as referred to above.

Aluminum anodizing operations generate a waste solution containing dissolved aluminum and acid, usually sulphuric, phosphoric and/or tartaric acid. This waste solution is usually treated with lime and/or caustic to precipitate solids, such as aluminum as $Al(OH)_3$, calcium sulphate or phosphate and other solids. Filtration of the solids gives a filter cake or waste treatment sludge, with typically 70% moisture. This is the aluminum anodizing waste treatment sludge, as referred to in this specification. The sludge contains aluminum hydroxide and other materials depending on the anodizing operation from which it is obtained.

The aluminum anodizing waste treatment sludge so produced is a waste material and the usual method of disposal of this non-hazardous sludge is landfilling, which is costly and environmentally responsible alternatives are lacking.

The present invention provides an alternative method for the disposal of the sludge which avoids the cost of landfilling and, at the same time, provides a method for the removal of fluoride from zinc electrolyte which is used in the electrowinning of zinc.

SUMMARY OF THE INVENTION

According to the invention, there is provided a method of removing fluoride from an aqueous metal sulphate solution comprising the steps of mixing the metal sulphate solution with a predetermined amount of an aluminum anodizing waste treatment sludge for a predetermined period of time to form a slurry mixture; and performing a solid/liquid separation on said slurry mixture to obtain a fluoride loaded sludge and a treated metal sulphate solution.

The method may further include the step of regenerating the fluoride loaded sludge by treatment thereof with a base. The base may comprise an alkali metal hydroxide, such as NaOH.

Also according to the invention, there is provided a method of disposing of aluminum anodizing waste treatment sludge comprising the steps of mixing the sludge with a fluoride containing metal sulphate solution for a predetermined period of time to form a slurry mixture; performing a solid/liquid separation on said slurry mixture to form a fluoride loaded sludge and a treated metal sulphate solution; and disposing of the fluoride loaded sludge.

The aluminum anodizing waste treatment sludge may be a wet sludge having a moisture content of about 60–80% water by weight or it may be a dry sludge having a moisture content of less than 2% water by weight. The dry sludge may comprise a wet sludge having a moisture content of about 60–80% water by weight which has been treated at 120°–140° C. for a predetermined period of time and then crushed. The sludge may also be partially dewatered with a water content of from about 2–60% water by weight.

The predetermined amount of sludge may be selected to provide from about 2 to about 10 g/L Al in said slurry mixture.

The predetermined time period will vary depending on the type of treatment sludge being used in the process. The time period is selected so that it is of sufficient duration for effective fluoride removal but not of such a duration that undesired redissolution of fluoride takes place. This can be easily verified by tests conducted with a specific sludge. The predetermined time period may vary from as little as one minute up to 70 hours or more.

Also according to the invention, there is provided a method of removing fluoride from a metal sulphate solution, comprising the steps of mixing the metal sulphate solution with a predetermined amount of a waste material containing aluminum hydroxide for a predetermined period of time to form a slurry mixture; and performing a solid/liquid separation on said slurry mixture to form a fluoride loaded sludge and a treated metal sulphate solution.

The method according to the invention may be carried out at ambient temperature.

Further objects and advantages of the invention will become apparent from the description of a preferred embodiment of the invention below.

DETAILED DESCRIPTION OF PREFERRED EMBODIMENT

Aluminum anodizing waste treatment sludge which, as stated above, contains aluminum hydroxide and other materials depending on the anodizing operation, is employed for the removal of fluoride from zinc electrolyte. In the present example, the zinc electrolyte contains about 150 g/L Zn dissolved as a sulphate and has a pH of about 5. The treatment is effected by mixing the sludge briefly with the electrolyte at ambient temperature. Sufficient sludge is used to provide from about 2 to about 10 g/L Al in the mixture. Fluoride is removed from solution by chemisorption onto the sludge. A solid/liquid separation is then performed.

Fluoride redissolution may occur if the filtration is delayed, depending on the individual characteristics of the sludge, which can vary. Fluoride removal in excess of 90% can be achieved, depending again on the characteristics of the particular waste treatment sludge and the Al concentration in the slurry mixture. The fluoride-loaded sludge is removed from the treated solution by settling and/or filtration. The loaded solids can then be disposed of in a lead smelter, the aluminum eventually being incorporated in a slag.

The consumption of the aluminum hydroxide sludge by a lead-zinc smelter thus provides an environmentally acceptable means of disposing of the sludge.

The invention will now be further described by means of the following Examples. The sludges used in the Examples were obtained from Kawneer Canada, Ltd., Lethbridge, Alberta, Canada; Coil Anodizers, Muskegon, Mich., U.S.A.; Anodizing, Inc., Portland, Oreg., U.S.A.; Purpose Extruded Aluminum Inc., Schofield, Wis.; and American Coil Anodizing, Streamwood, Ill. The sludges vary in composition, for example:

The Kawneer sludge comprises about 70% water; 8.32% Al; 0.03% Fe; 0.01% Cr; 0.02% Sn; 0.02% Ni; 1.59% sulphate; less than 0.01% Zn; 0.11% Ca; 0.05% Mg; 0.27% Na; 0.07% silica; 2.52% tartaric acid; 0.04% tin sulphate; 0.08% $NiSO_4 \cdot 6H_2O$. This sludge contains 0.16% F, based on dry sludge weight.

The Coil Anodizers sludge comprises 77% water; 12% $Al(OH)_3$; 0.05% F; 10–13% phosphates; 1% other substances, including calcium, sodium, sulphate and trace metals. This sludge contains 0.05% F, based on dry sludge weight.

The Anodizing Inc. sludge contains about 85% moisture and based on dry weight: 60–65% $Al_2O_3$, 0.1–0.2% Cr, 0.02–0.03% Cu, 0.75–1.4% Fe, 0.29–0.34% MgO, 0.15–0.18% Ni, 0.04–0.06% Pb, 0.02–0.03% Sb, 0.7–0.83% $SiO_2$, 0.67–0.74% Sn, 0.01% Te, up to 0.04% Zn, and 0.13 to 0.19% F.

The Purpose Extruded Aluminum Inc. sample contains about 70% water and based on dry weight: 31% Al, 0.18% Cr, 0.02% Cu, 1.3% Fe, 0.36% MgO, 0.11% Ni, 0.04% Pb, 0.04% Sb, 0.43% $SiO_3$, 0.02% Zn and 0.13% F.

EXAMPLE 1

This example compares the effectiveness of dried, crushed anodizing sludges for fluoride removal with the total ineffectiveness of (crystalline) alumina trihydrate. Samples of sludge from the following anodizers were tested: Kawneer Canada Ltd., Lethbridge, AB; Coil Anodizers, Inc., Muskegon, Mich.; Anodizing Inc., Portland, Oreg. The pH values of the wet sludges were measured, and the sludge samples were dried and crushed, and analyzed by XRD. (Values of pH were determined on slurries of 4 parts wet sludge with 1 part water to fluidize the sludge.) Portions of dried sludge were each tested for F removal effectiveness by mixing with zinc sulphate solution (150 g/L Zn, and containing F as shown in Table 1). The mixture was filtered, and fluoride concentrations determined for the filtrates. Crystalline alumina trihydrate, produced by Anodizing Inc., Portland, Oreg., was also dried and crushed in the same manner, and mixed with zinc sulphate solution containing fluoride. This slurry was filtered in the same manner as for the anodizing sludges. The filtrate F concentrations (e.g., Kawneer sludge treated: 6 mg/L; Coil Anodizers sludge treated: 3 mg/L; alumina trihydrate treated: 40 mg/L), show the sharp contrasts in F removal effectiveness between the anodizing sludges and alumina trihydrate.

TABLE 1 pH measurements, X-ray diffraction results and fluoride removal data for alumina trihydrate and anodizing waste treatment sludge samples

| Supplier | sludge pH | crystal type | initial F in solution treated (g/L) | final F in solution treated (g/L) | mix time (min) | g/L Al used for F removal |
|---|---|---|---|---|---|---|
| Sludge samples (effective for F removal): | | | | | | |
| Coil Anodizers | 7.2 | mostly amorphous | 40 | 3 | 30 | 10 |
| Kawneer Anodizing | 6.8 | mostly amorphous | 40 | 6 | 30 | 10 |
| Anodizing Inc. | sample 1: 6.8 | amorphous | 190 | 100 | 30 | 10 |
| | sample 2: 8.1 | mostly amorphous | 180 | 130 | 30 | 3 |
| Purpose Extruded Aluminum | 9.2 | amorphous with some bayerite | 180 | 120 | 30 | 3 |
| American Coil Anodizers | sample 1: 7.8 | mostly amorphous | 180 | 15 | 30 | 6[a] |
| | | | 190 | 110 | 30 | 3[a] |

TABLE 1-continued pH measurements, X-ray diffraction results and fluoride removal data
for alumina trihydrate and anodizing waste treatment sludge samples

| Supplier | sludge pH | crystal type | initial F in solution treated (g/L) | final F in solution treated (g/L) | mix time (min) | g/L Al used for F removal |
|---|---|---|---|---|---|---|
| | sample 2: 7.1 | amorphous | 190 190 190 | 125 26 115 | 30 30 30 | 3 3[a] 3 |
| alumina trihydrate sample (not effective for F removal); | | | | | | |
| Anodizing Inc. | 9.9 | gibbsite | 40 | 40 | 30 | 10 |

[a] wet sludge used in this test

EXAMPLE 2

The following test was done separately for each of two anodizing sludge samples, one sample from Anodizing Inc.., and the other from Coil Anodizers, Inc. To zinc sulphate solution containing 150 g/L zinc and 45 mg/L F was added dried and crushed anodizing sludge, sufficient to give 10 g/L Al in the resulting slurry. The mixture was stirred for 30 min and filtered. The filtrate treated with the Coil Anodizers, Inc. sludge contained 5.3 mg/L F, and that treated with the Anodizing Inc. sludge contained 21 mg/L F. This example further demonstrates the variability between the sludges.

EXAMPLE 3

The following tests were done separately for each of two anodizing sludge samples, one from Coil Anodizers, the other from Kawneer Canada, and at various Al concentrations: 2 g/L, 5 g/L and 10 g/L. To zinc sulphate solution containing 150 g/n Zn and 205 mg/L F was added sufficient wet sludge to give the desired Al concentration in the resulting slurry. The slurries were mixed in a kitchen blender for a predetermined time and then filtered. The results are shown in Table 2.

It can be seen again, as in Examples 1 and 2, that the sludge samples differ in effectiveness. Also, a higher Al concentration results in greater fluoride removal. Redissolution of fluoride with continued mixing for 20 min as compared to 1 min is also demonstrated in these examples. This effect appeared to be significant only in the case where the fluoride concentration in the received sludge was particularly high (Kawneer sample: 0.16% of dry weight).

TABLE 2

Data on fluoride removal: various Al concentrations, mixing times and anodizing sludge samples

| sludge sample used | mixing time (min) | Al concentration (g/L) in the slurry | F concentration (mg/L) in the treated solution |
|---|---|---|---|
| Coil Anodizers | 1 | 2 | 47 |
| " | 1 | 5 | 10 |
| " | 1 | 10 | 4 |
| " | 20 | 10 | 7 |
| Kawneer Canada | 1 | 2 | 130 |
| " | 1 | 5 | 64 |
| " | 1 | 10 | 25 |
| " | 20 | 10 | 135 |

EXAMPLE 4

In eight tests, samples of anodizing sludge from two producers were briefly mixed in sufficient amounts to give 10 g/L AL, with zinc sulphate solution containing 150 g/L Zn and 205 mg/n F. Tests were done with dry and with wet sludge, and filtration was carried out immediately in some tests and after 66 hours of standing without agitation, in other tests, to determine whether dissolution of fluoride occurred if the fluoride-loaded sludge was left in contact with the treated solution. Before the dried sludge was used, it was ground using a mortar and pestle. The effect of particle size on fluoride removal was not studied. However, because the fluoride removal is a chemisorption process, it is likely that fluoride removal would be more efficient at a lower particle size, due to the greater surface area.

The results are shown in Table 3.

TABLE 3

Data for tests on fluoride redissolution

| Sludge producer | Sludge used as received (wet) or dried and crushed | Time elapsed after mixing and before filtering (h) | F concentration (mg/L) in ttreated solution | Al concentration (mg/L) in treated solution |
|---|---|---|---|---|
| Coil Anodizers | wet | 0 | 4 | 2 |
| " | wet | 66 | 3 | 2 |
| " | dry | 0 | 52 | 40 |
| " | dry | 66 | 37 | 28 |
| Kawneer Canada | wet | 0 | 36 | 24 |
| " | wet | 66 | 75 | 240 |

TABLE 3-continued

| | Data for tests on fluoride redissolution | | | |
|---|---|---|---|---|
| Sludge producer | Sludge used as received (wet) or dried and crushed | Time elapsed after mixing and before filtering (h) | F concentration (mg/L) in ttreated solution | Al concentration (mg/L) in treated solution |
| " | dry | 0 | 95 | 55 |
| " | dry | 66 | 120 | 73 |

EXAMPLE 5

This example is an exploratory test that shows that the process according to the invention is effective for removal of fluoride from copper sulphate solution. Wet sludge from Coil Anodizers Inc. was stirred for 30 min with a copper sulphate solution (52 g/L Cu, 200 mg/L F). The test was done at ambient temperature and 10 Al. The F-loaded sludge was then filtered off, giving a filtrate containing 6 mg/L F. The final Cu concentration was 36 g/L.

EXAMPLE 6

This example is an exploratory test that shows the process according to the invention is effective for removal of fluoride from nickel sulphate solution. Wet sludge from Coil Anodizers Inc. was stirred for 30 min with a nickel sulphate solution (9.5 g/L Ni, 205 mg/n F). The test was done at ambient temperature and 10 g/L Al. The F-loaded sludge was then filtered off, giving a filtrate containing 3 mg/L F. The final Ni concentration was 6.6 g/L.

EXAMPLE 7

This example shows that the sludge can be regenerated, after the fluoride removal step, with caustic, and then reused.

250 ml zinc sulphate solution containing 150 g/L Zn and 190 mg/L F was stirred for 30 minutes at ambient temperature with sufficient wet American Coil Anodizing sludge, sample 1 (Table 1) to give 10 g/n Al. The sludge was filtered off, rinsed with water, and then stirred with 100 ml of a 10 g/L NaOH solution for 30 minutes at ambient temperature. The regenerated sludge was filtered off and used again for fluoride removal as in the first step. This process was repeated for three fluoride removal cycles.

In a separate series of tests, three cycles of F-removal were carried out, but without the caustic regeneration steps. The data are shown in Table 4.

TABLE 4

| Data on caustic regeneration and reuse of anodizing waste treatment sludge Zinc sulphate head solution: 190 mg/L F | | | |
|---|---|---|---|
| | Pass # | | |
| | 1 | 2 | 3 |
| With caustic regeneration: | | | |
| F concentration (mg/L) in zinc sulphate solution after treatment | 32 | 29 | 56 |
| F concentration (mg/L) in subsequent caustic wash | 165 | 240 | 250 |
| Al concentration (mg/L) in caustic wash | 120 | 215 | 135 |

TABLE 4-continued

| Data on caustic regeneration and reuse of anodizing waste treatment sludge Zinc sulphate head solution: 190 mg/L F | | | |
|---|---|---|---|
| | Pass # | | |
| | 1 | 2 | 3 |
| Without caustic regeneration: | | | |
| F concentration (mg/L) in zinc sulphate solution after treatment | 30 | 85 | 105 |

NOTE: The final sludge from the test without caustic regeneration contained 1.3% F. That from the test with caustic regeneration contained 0.46% F.

It can be seen from Table 4 that F removal on repeated use of the sludge was significantly improved by interspersing a caustic regeneration step. It is also noted that some Al dissolution in the caustic soda solution occurs (in this example, less than 1% of the Al present in the sludge).

While the specific examples given above refer to treatment with an aluminum anodizing waste treatment sludge, it will be appreciated that other suitable waste materials containing amorphous aluminum hydroxide can also be used in the method according to the invention, such as illustrated by the following example.

EXAMPLE 8

This example shows that a paper mill waste treatment sludge can also be used for fluoride removal.

The sludge used in this test was obtained from Island Paper Mills, New Westminster, B.C., Canada. The wet sludge contains 65% moisture. Based on dry weights, the sludge contains 3.0% Al, 0.02% Cr, 0.26% Fe, 0.47% MgO, 0.01% Ni, 0.03% Pb, 6.1% $SiO_2$ and 0.019% F.

A sufficient amount of this sludge was mixed with zinc sulphate solution (150 g/L Zn, 170 mg/L F) to give 3 g/L Al. Mixing was continued for 30 minutes at ambient temperature. A portion of the mixture was filtered immediately while the rest was allowed to stand for 48 hours before filtration. Experiments were done on both wet and dried sludge.

The resulting F concentrations are shown in Table 5.

TABLE 5

| Data on F removal using paper mill sludge | | | |
|---|---|---|---|
| Test # | dry or wet sludge | time lapse before filtration (h) | Final F concentration in treated solution (mg/L) |
| 1 | wet | 0 | 80 |
| 2 | wet | 48 | 68 |
| 3 | dry | 0 | 105 |
| 4 | dry | 48 | 86 |

For this sludge, a larger exposure time results in improved fluoride removal. It should be noted, however, that the difference between the results using wet sludge and dry sludge (e.g. Tests #1 and 3) could be accounted for by dilution because of the moisture in the wet sludge.

Since different sludges vary in their characteristics, and hence their effectiveness, it will be appreciated that any fluoride removal process must be optimized for the particular sludge used.

While only preferred embodiments of the invention have been described herein in detail, the invention is not limited thereby and modifications can be made within the scope of the attached claims.

What is claimed is:

1. A method of removing fluoride from an aqueous metal sulphate solution comprising the steps of:

mixing the metal sulphate solution with a predetermined amount of an aluminum anodizing waste treatment sludge for a predetermined period of time to form a slurry mixture; and performing a solid/liquid separation on said slurry mixture to obtain a fluoride loaded sludge and a treated metal sulphate solution.

2. The method according to claim 1, wherein said treatment sludge is a wet sludge having a moisture content of about 60–80% water by weight.

3. The method according to claim 1, wherein said treatment sludge is a dry sludge having a moisture content of less than 2% water by weight.

4. The method according to claim 3, wherein said dry sludge comprises a wet sludge having a moisture content of about 60–80% water by weight which has been treated at 120°–140° C. for a predetermined period of time and then crushed.

5. The method according to claim 1, wherein said treatment sludge is a partially dewatered sludge having a water content of about 2–60% water by weight.

6. The method according to claim 1, wherein said metal sulphate solution is a zinc sulphate solution.

7. The method according to claim 1, wherein said metal sulphate solution is a copper sulphate solution.

8. The method according to claim 1, wherein said metal sulphate solution is a nickel sulphate solution.

9. The method according to claim 1, wherein said predetermined amount of sludge is selected to provide from about 2 to about 10 g/L Al in said slurry mixture.

10. The method according to claim 1, further comprising the step of regenerating the fluoride loaded sludge by treatment thereof with a base.

11. The method according to claim 10, wherein said treatment comprises mixing the fluoride loaded sludge with a predetermined amount of the base for a predetermined period of time; and performing a solid/liquid separation to obtain a regenerated sludge.

12. The method according to claim 11, wherein the base comprises an alkali metal hydroxide solution.

13. A method of disposing of a waste material in the form of an aluminum anodizing waste treatment sludge, comprising the steps of:

mixing the sludge with a fluoride containing metal sulphate solution for a predetermined period of time to form a slurry mixture;

performing a solid/liquid separation on said slurry mixture to form a fluoride loaded sludge and a treated metal sulphate solution; and disposing of the fluoride loaded sludge.

14. The method according to claim 13, wherein said fluoride loaded sludge is disposed of in a lead smelter.

15. The method according to claim 13, wherein said metal sulphate solution is a zinc sulphate solution.

16. The method according to claim 13, wherein said metal sulphate solution is a copper sulphate solution.

17. The method according to claim 13, wherein said metal sulphate solution is a nickel sulphate solution.

18. A method of removing fluoride from a metal sulphate solution, comprising the steps of:

mixing the metal sulphate solution with a predetermined amount of a waste material containing aluminum hydroxide for a predetermined period of time to form a slurry mixture; and performing a solid/liquid separation on said slurry mixture to form a fluoride loaded sludge and a treated metal sulphate solution.

19. The method according to claim 18, wherein said waste material comprises a paper mill sludge.

* * * * *